(12) United States Patent
Dale et al.

(10) Patent No.: US 8,997,353 B2
(45) Date of Patent: Apr. 7, 2015

(54) APPARATUS, SYSTEM, AND METHOD FOR SHAPING A VALVE ORIFICE

(75) Inventors: Adrian P. Dale, Columbus, IN (US); Vivek A. Sujan, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 1426 days.

(21) Appl. No.: 12/044,933

(22) Filed: Mar. 8, 2008

(65) Prior Publication Data

US 2009/0224190 A1    Sep. 10, 2009

(51) Int. Cl.
| | |
|---|---|
| *F16K 5/06* | (2006.01) |
| *F16K 5/12* | (2006.01) |
| *F16K 31/05* | (2006.01) |
| *F02B 39/00* | (2006.01) |
| *F02B 37/18* | (2006.01) |
| *F16K 37/00* | (2006.01) |
| *F02B 37/013* | (2006.01) |

(52) U.S. Cl.
CPC . *F02B 37/18* (2013.01); *F16K 5/12* (2013.01); *F02B 37/013* (2013.01); *Y02T 10/144* (2013.01); *F16K 31/055* (2013.01); *F02B 39/00* (2013.01); *F16K 37/0083* (2013.01)

(58) Field of Classification Search
USPC ........... 29/890.12, 890.126, 890.13, 890.132, 29/890.127–890.129, 890.09, 890.142, 29/890.143; 251/126, 127, 205–209
See application file for complete search history.

(56) References Cited

U.S. PATENT DOCUMENTS

| | | | | |
|---|---|---|---|---|
| 3,590,873 | A * | 7/1971 | Duff et al. | 137/625.46 |
| 4,010,930 | A * | 3/1977 | Sands | 251/314 |
| 4,825,523 | A * | 5/1989 | Nakazawa et al. | 29/889.2 |
| 5,551,467 | A * | 9/1996 | Booth et al. | 137/1 |
| 6,367,773 | B1 * | 4/2002 | Ito | 251/305 |
| 6,976,505 | B2 * | 12/2005 | McLane et al. | 137/625.11 |
| 7,028,708 | B1 | 4/2006 | Langenfeld et al. | |

FOREIGN PATENT DOCUMENTS

WO    WO 2006053414 A1 *    5/2006

OTHER PUBLICATIONS

Nova Orifice Venturi Valves, Schlumberger, http://www.slb.com/media/services/artificial/gas/rglv/nova_ovv.pdf.
E.G. Butchart et al., Hall Easy-Fit, Medtronic, http://www.ctsnet.org/file/vendors/609/pdf/hemodyn.pdf.

* cited by examiner

*Primary Examiner* — Christopher Besler
(74) *Attorney, Agent, or Firm* — Foley & Lardner LLP

(57) ABSTRACT

An apparatus, system, and method are disclosed for optimizing a valve orifice shape. According to one representative embodiment, a method includes determining a specified relationship between a valve position and an output characteristic, and determining an orifice profile. The method also includes determining a relationship of an orifice area to the output characteristic. Further, the method includes shaping an orifice in a valve based on the orifice profile and the specified relationship between the valve position and the output characteristic. According to the method, the valve should approximately exhibit the specified relationship.

15 Claims, 15 Drawing Sheets

900

| Position (current) | Effective flow area (current) | Position (desired) | Effective flow area (desired) |
|---|---|---|---|
| $\theta$ | EFA | $\theta'$ | EFA |
| ... | ... | ... | ... |
| ... | ... | ... | ... |

Fig. 9

APPARATUS, SYSTEM, AND METHOD FOR SHAPING A VALVE ORIFICE

FIELD

This invention relates to methods of fluid dynamic control and more particularly relates to a method for shaping a valve orifice.

BACKGROUND

Valves perform an important and integral function for most fluid control schemes. Present combustion engines rely on an array of valves to regulate the flow of fluids throughout the engine's various systems. Valves perform a critical role regulating the flow of fluids to achieve emissions control standards, fuel efficiency, engine braking, and protection of engine components.

A common valve utilized presently in many applications is the rotary valve. A typical rotary valve consists of a stationary structure placed in-line with a fluid flow and a rotating sleeve configured such that the rotating sleeve may be turned to various angles, each angle corresponding to a specific fluid flow. The rotating sleeve contains a flow-through passage with an intake orifice and an outlet orifice. The orifices are generally shaped as conveniently as possible, such as an oval or a rectangle. When the sleeve passage is fully in-line with the fluid flow the valve may be considered to be fully open. When the sleeve is rotated such that a wall of the sleeve fully blocks the passage (no section of the orifice is exposed to the passage) the valve may be considered to be fully closed. At intermediate valve positions, a rotary valve may provide an intermediate restriction between fully open and fully closed. In practice, the flow rate through the valve is highly non-linear, providing rapidly increasing flow as the valve is slightly opened, and very little flow increase beyond a medium-opened valve.

Designing control algorithms to take advantage of the rotary valve's continuous range of fluid flows introduces challenges. For example, a valve controller may comprise an analog to digital controller that uses a voltage to communicate with the valve controller. For example, a voltage range of 0 to 5 volts may correspond to the 5 volts being a fully closed position of the valve and the 0 volts corresponding to a fully open position of the valve. A typical valve controller may assign 10 bits of memory, with 1,024 different values for position, for commanding a valve position, and assign 6 bits, with 64 different values, for providing diagnostics. Of the 1,024 possible value positions, typically only the first 100 are relevant as a 10% opened valve may already allow 60% or more of the total flow. Further, the electronics of the system may allow the true valve position to be detected only within ±0.2 volts (in one example), meaning that the valve really only has about 25 available positions in resolvable increments of ±40 of the original 1,024 possible valve positions.

As a further complication, some systems utilize the valve in a non-linear fashion, requiring some flow regimes preferentially over other flow regimes. For example, a system may require flow areas of about 0-10% open about 50% of the time, and flow areas of about 85-100% open about 50% of the time, but rarely require flow areas between 10% and 85%. When the non-linearity of use is combined with the physical non-linearity of flow in a typical rotary valve, it is clear that a rotary valve used in the current art has complications in control, uniformity of usage, and durability through asymmetrical usage.

One specific example occurs in an internal combustion engine application. Some diesel engines utilize two turbochargers in series, with a small responsive (high pressure) turbocharger in line with a large slower responding (low pressure) turbocharger. At very low flow rates, the small turbocharger is utilized to provide a responsive engine to operator torque requests. At higher flow rates, the smaller turbocharger is bypassed and the larger turbocharger dominates the air flow workload for the engine. A typical bypass valve in the industry is a rotary valve. When the speed-load map of the engine is considered, and the amount of time that an engine spends at various workloads is considered, it is apparent that a rotary bypass valve for a high pressure turbocharger suffers from the control drawbacks of current rotary valves. At low flow rates, the controller is utilizing only a few bits of the available valve position commands, and suffering from a high signal to noise ratio as many of the assignable bits for valve position are not utilized. At high flow rates, the controller is merely opening the bypass valve completely and utilizing the 100%-open commands. Therefore, a typical rotary valve in a diesel application provides a highly non-linear response with a high signal-to-noise ratio, and also does not utilize the middle range of the rotary valve positions.

SUMMARY

From the foregoing discussion, it should be apparent that a need exists for an apparatus, system, and method to simplify control of rotary valves. Beneficially, such an apparatus, system, and method would permit a uniform movement of a valve for a correspondingly uniform change in an output characteristic such as fluid flow, and/or provide for uniform utilization of the valve through the operating range of an application.

The present invention has been developed in response to the present state of the art, and in particular, in response to the problems and needs in the art that have not yet been fully solved by currently available rotary valves. Accordingly, the present invention has been developed to provide an apparatus, system, and method for shaping a valve orifice that overcome many or all of the above-discussed shortcomings in the art.

According to one representative embodiment, a method for optimizing an orifice shape includes determining a specified relationship between a valve position and an output characteristic. The method also includes determining an orifice profile comprising a relationship of an orifice area to the output characteristic. Additionally, the method includes shaping an orifice in a valve based on the orifice profile and the specified relationship between the valve position and the output characteristic. The orifice is shaped in this manner such that the valve exhibits approximately the specified relationship. In some implementations, the output characteristic includes a relative flow rate of fluid through the valve and/or a relative coverage of at least a portion of a torque-speed map. In yet some implementations, the specified relationship includes a linear relationship between the valve position and the relative flow rate of fluid through the valve and/or a linear relationship between the valve position and the relative coverage of at least a portion of the torque-speed map.

According to certain implementations, the orifice area includes one of a projected exposed area (PEA) and an effective flow area (EFA). In some implementations where the orifice area includes a PEA, determining the orifice profile includes determining the output characteristic for the PEA from a calibration valve. In some implementations where the orifice area includes an EFA, determining the orifice profile includes determining the output characteristic for the EFA from a computational fluid dynamics model.

In some implementations of the method, shaping the orifice in a valve includes shaping a closest physically realizable orifice in a valve, a best-fit triangular approximation, and a best-fit approximation of easily-machined shapes.

The shaped orifice discussed above can, in some implementations, include a first orifice. In these implementations, the method can also include determining a performance curve for the first orifice where the performance curve includes an exhibited relationship between the valve position and the output characteristic for the first orifice. The method can further include determining an improvement index for the first orifice based on the performance curve and the specified relationship. Additionally, the method can include generating a second orifice profile based on the improvement index and the orifice profile such that the second orifice profile exhibits an improved performance curve for the second orifice.

According to another embodiment, an apparatus for optimizing an orifice shape includes a specified relationship module, an orifice profile module, and an orifice shaping module. The specified relationship module is configured to determine a valve orifice position for an output characteristic. The orifice profile module configured to produce an orifice profile for the specified relationship. The orifice shaping module configured to produce an orifice shape based on the orifice profile and the specified relationship. In some implementations, the specified relationship includes an approximately linear relationship between rate of fluid flow through a valve and a valve position. In other implementations, the specified relationship includes an approximately linear relationship between an accumulated area under a torque-speed map and a valve position.

In another embodiment, an apparatus for optimizing an orifice shape includes a valve and a valve orifice. The valve orifice is shaped by a process that includes determining a specified relationship between a valve position and an output characteristic, determining an orifice profile comprising a relationship of an orifice area to the output characteristic, and shaping an orifice in a valve based on the orifice profile and the specified relationship between the valve position and the output characteristic such that the valve exhibits approximately the specified relationship.

In some implementations, the valve is a rotary valve. In yet some implementations, the valve orifice is shaped such that for every degree radius of turn of the valve a substantially uniform change in a fluid flow through the valve is achieved. The valve orifice can be shaped such that for every degree radius of turn of the valve a substantially uniform change in a torque-speed map is achieved. Additionally, the valve orifice can have a shape configured as a best-fit approximation of easily manufactured shapes. In certain implementations, the valve orifice is a best-fit triangle.

According to yet another embodiment, a system for optimizing a valve for configurable response includes an internal combustion engine, a turbocharger; and a rotary valve having an optimized orifice profile. The orifice profile is optimized by determining a specified relationship between a desired valve orifice position and a desired output characteristic, determining an orifice profile based on an orifice area for the desired output characteristic, and shaping an orifice in the valve based on the orifice profile and the specified relationship between the desired valve orifice position and the desired output characteristic. The shape of the orifice is such that the valve exhibits approximately the specified relationship. The rotary valve of the system can be one of a barrel valve and a bypass valve. Further, the orifice can have the shape of a best fit triangle.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, a description and explanation of various embodiments of the invention with additional specificity and detail will be aided through the use of the accompanying drawings, in which:

FIG. 9 is a table illustrating one embodiment of required input for optimizing an orifice shape;

DETAILED DESCRIPTION

Figure 1:
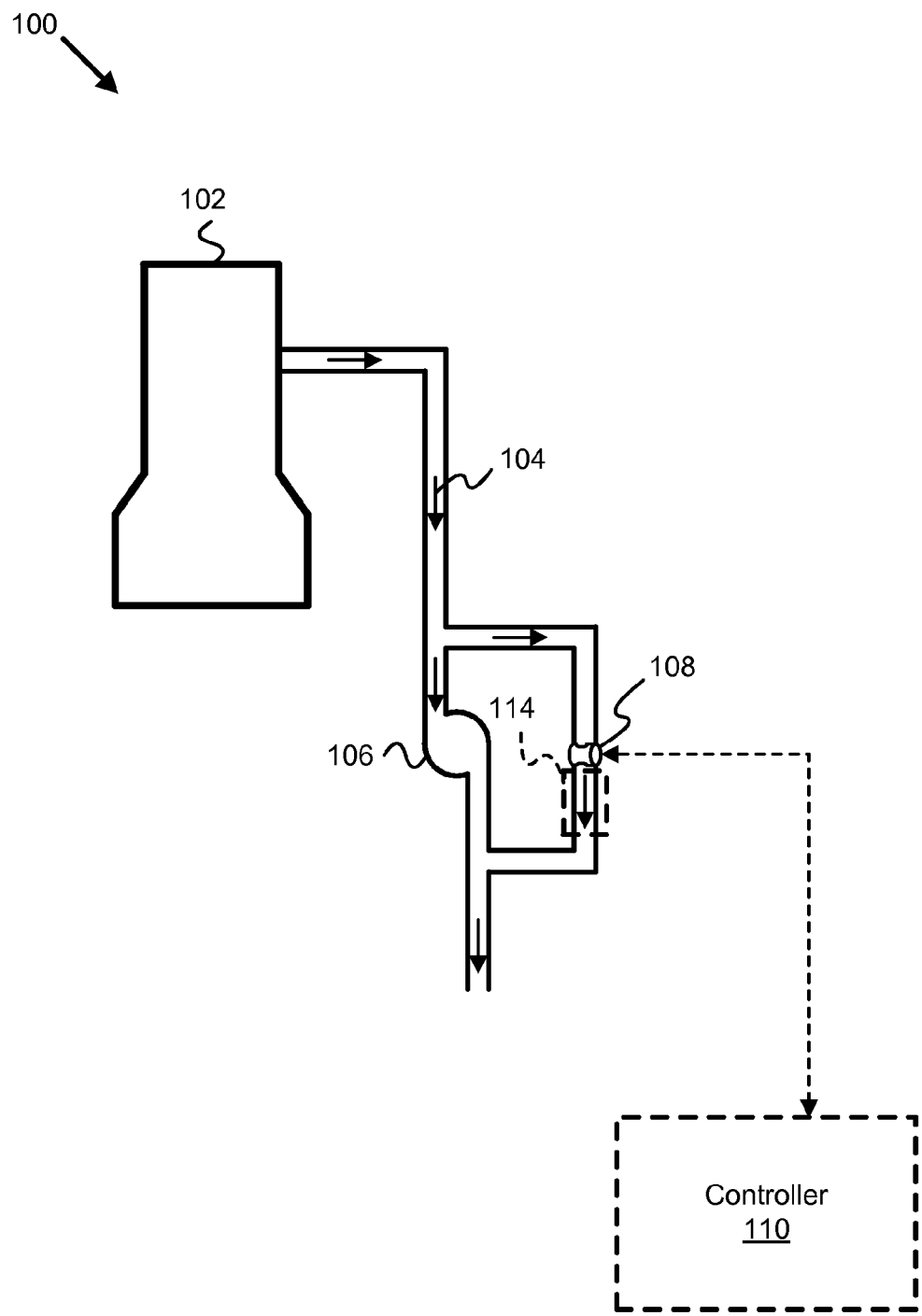
FIG. 1 is a schematic illustration depicting one embodiment of a system to design a valve orifice profile.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic illustration depicting one embodiment of a system 100 to shape a valve orifice. The system 100 includes an engine 102 that may be a gasoline engine, diesel engine, combustion engine, or any type of engine producing a fluid flow 104. The system 100 further includes a turbine device 106. In one embodiment, the turbine device 106 is a turbocharger. Additionally, the system 100 includes a rotary valve 108. The rotary valve may be a barrel valve configured as a bypass valve for the turbocharger 106. The opening and closing of the bypass valve 108 may be initiated by an engine control module (ECM), e.g., controller 110. The bypass valve 108 may be configured to be rotated to a plurality of valve positions corresponding to a plurality of rates of fluid flow through the valve 108.

The controller 110 includes modules configured to determine a specified relationship between a valve position and an output characteristic, create a valve orifice profile based on the specified relationship, and optimize the orifice profile to a best-fit configuration. The controller 110 may comprise a specified relationship module, an orifice profile module, and an orifice shaping module.

The output characteristic may be a flow rate 114 through the valve 108, a torque, an engine speed, and/or other output characteristic affected by the opening and the closing of the valve 108. In one embodiment of the system 100, the specified relationship may comprise a linear relationship between the valve position and the output characteristic such that for every x degrees of a turn of the valve a y change in the output characteristic occurs. For example, the output characteristic may comprise a portion of a torque-speed map for an engine 102, where for every x degrees of a turn of the valve 108 an approximately linear y change in the torque-speed is achieved.

Figure 2A:
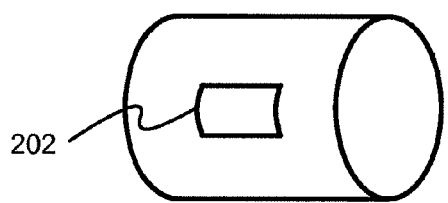
FIG. 2A is an illustration depicting one example of a typical or conventional valve orifice profile.

FIG. 2A is an illustration depicting one example of a typical or known valve orifice profile 202. The shape of orifices in most valves is determined by convention and convenience with shapes such as rectangles being prevalent as they are easier to machine. In embodiments comprising typical valve orifice profiles 202, designers of systems requiring substantially precise monitoring of flows must devote time and expense to testing these orifices profiles 202 and compiling complex piecemeal algorithms.

Figure 2B:
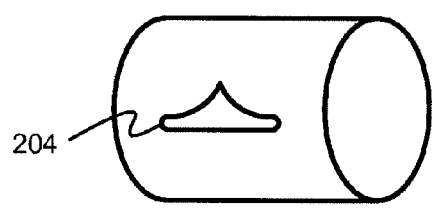
FIG. 2B is an illustration depicting one example of an optimal valve orifice profile.

FIG. 2B is an illustration depicting one embodiment of a shaped valve orifice 204 according to the present disclosure. The shaped valve orifice 204 may comprise an 'ideal' shape for a valve orifice such that the shape conforms to a derived shape generated by the orifice shaping module.

Figure 2C:
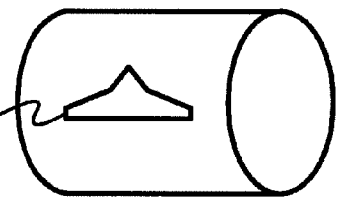
FIG. 2C is an illustration depicting one example of a best-fit valve orifice profile.

The derived shape may be utilized in one application, while a best-fit shape may be preferred in an alternate application. The best-fit shape may comprise a shape that may be easier and less costly to produce. The best-fit shape may be derived from a plurality of easily machined shapes. The best-fit shape may be further optimized through an iterative process of testing the best-fit against the desired output. FIG. 2C is an illustration depicting one example of a best-fit valve orifice 206. The best-fit valve orifice 206 may comprise a series of connected straight lines, etching out an area and shape approximating the shaped valve orifice 204 of FIG. 2B. This configuration may be the easily machined, cost-effective implementation of shaped valve orifice 204.

Figure 2D:
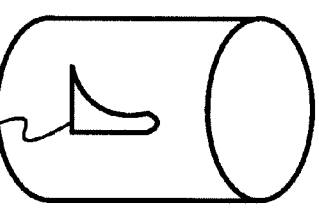
FIG. 2D is an illustration depicting an alternate example of an optimal valve orifice profile.

FIG. 2D is an illustration depicting an alternate example of a shaped valve orifice 208. In one embodiment, the shaped valve orifice 208 has an 'ideal' shape for a valve orifice such that the shape conforms to a derived shape generated by the orifice shaping module. In one embodiment, the shaped valve orifice 208 has an equivalent effective flow area (EFA) solution as the shaped valve orifice 204, with the shaped valve orifice 204 comprising a symmetrical embodiment of shaped valve orifice 208.

Figure 2E:
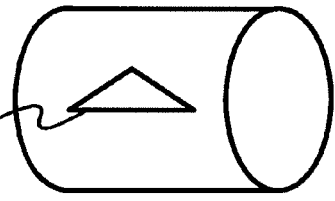
FIG. 2E is an illustration depicting one example of a best-fit triangle valve orifice profile.

FIG. 2E is an illustration depicting one example of a best-fit triangle valve orifice 210. The best-fit triangle valve orifice 210 may provide a cost-effective implementation of the shaped valve orifice 204. Iterative testing of the best-fit triangle valve orifice 210 shape may be used to maximize the desired output characteristic.

Figure 2F:
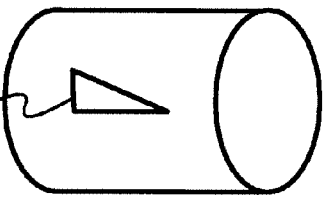
FIG. 2F is an illustration depicting an alternate example of a best-fit triangle valve orifice profile.

FIG. 2F is an illustration depicting an alternate example of a best-fit triangle valve orifice 212. The best-fit triangle valve orifice 212 may provide a cost-effective implementation of the shaped valve orifice 208. Iterative testing of the best-fit triangle valve orifice 212 shape may be used to maximize the desired output characteristic.

Figure 3A:
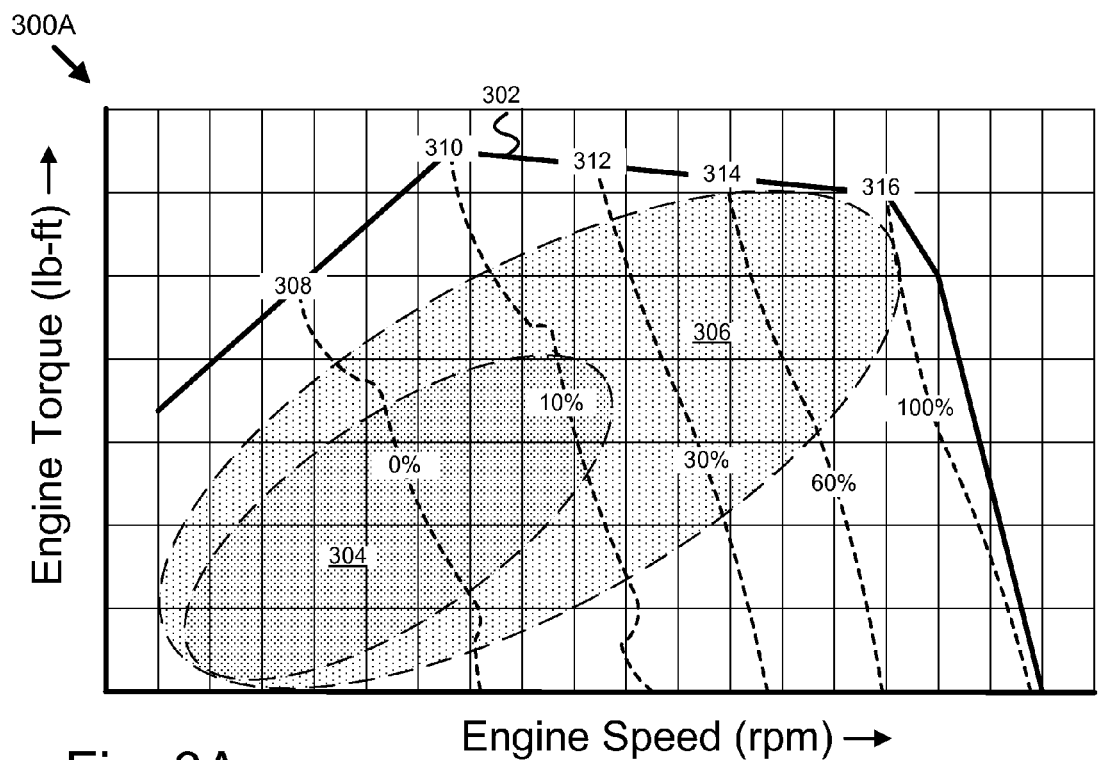
FIG. 3A is a graph illustrating one embodiment of a torque-speed map for an expected engine duty cycle with a typical valve orifice profile.

FIG. 3A is a graph illustrating one embodiment of a torque-speed map 300A for an expected engine duty cycle with an orifice profile corresponding to the typical valve orifice profile 202. The torque-speed map 300A depicts a maximum-rated torque line 302, a high-usage area 304, a low-usage area 306, and valve position curves corresponding to 0% valve open curve 308, 10% valve open curve 310, 30% valve open curve 312, 60% valve open curve 314, and 100% valve open curve 316. A portion of the torque-speed map 300A lies below the 0% valve open curve 308, where there may be no requirement for an open valve. Of the torque-speed workspace portion above the 0% valve open curve 308 about one half of the workspace lies between the 0% valve open curve 308 and the 10% valve open curve 310. The shape of the typical valve orifice 202 may abruptly permit a significant portion of the total fluid flow through the valve 108 within the first 10% of a total valve rotation.

Figure 3B:
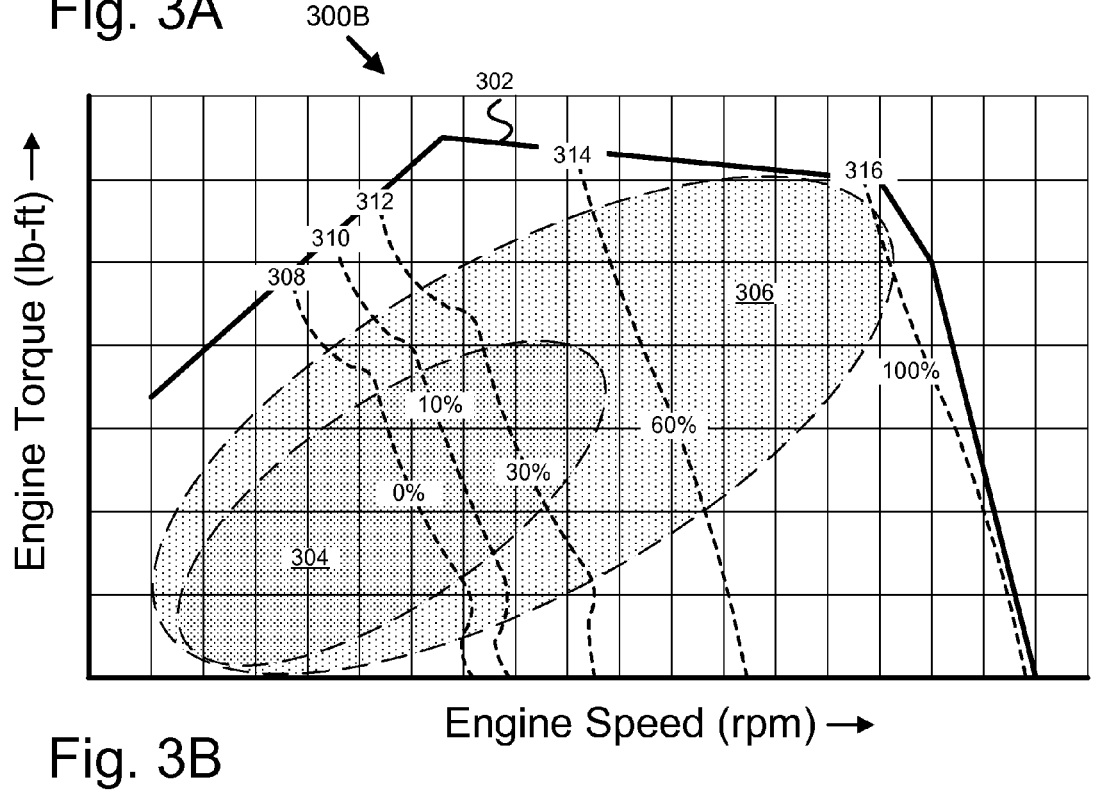
FIG. 3B is a graph illustrating one embodiment of a torque-speed map for an expected engine duty cycle with a shaped valve orifice profile.

FIG. 3B is a graph illustrating one embodiment of a torque-speed map 300B for an expected engine duty cycle with a shaped valve orifice profile, such as one of the profiles corresponding to the shaped orifices shown in FIGS. 2B-2F. More specifically, FIG. 3B may show the torque-speed map 300B for a reshaped valve orifice 204 from FIG. 2B. In one embodiment, FIG. 3B comprises a linearization of the function consisting of the valve position versus torque-speed. For example, at an initial 10% open turn of the shaped valve 108, with a shaped value orifice, a corresponding 10% increase in torque-speed is achieved versus a valve 108 with a typical valve orifice shape. In the map 300A associated with a typical valve orifice shape, the open valve curve at 10% corresponds to nearly 50% of the torque-speed.

Figure 4A:
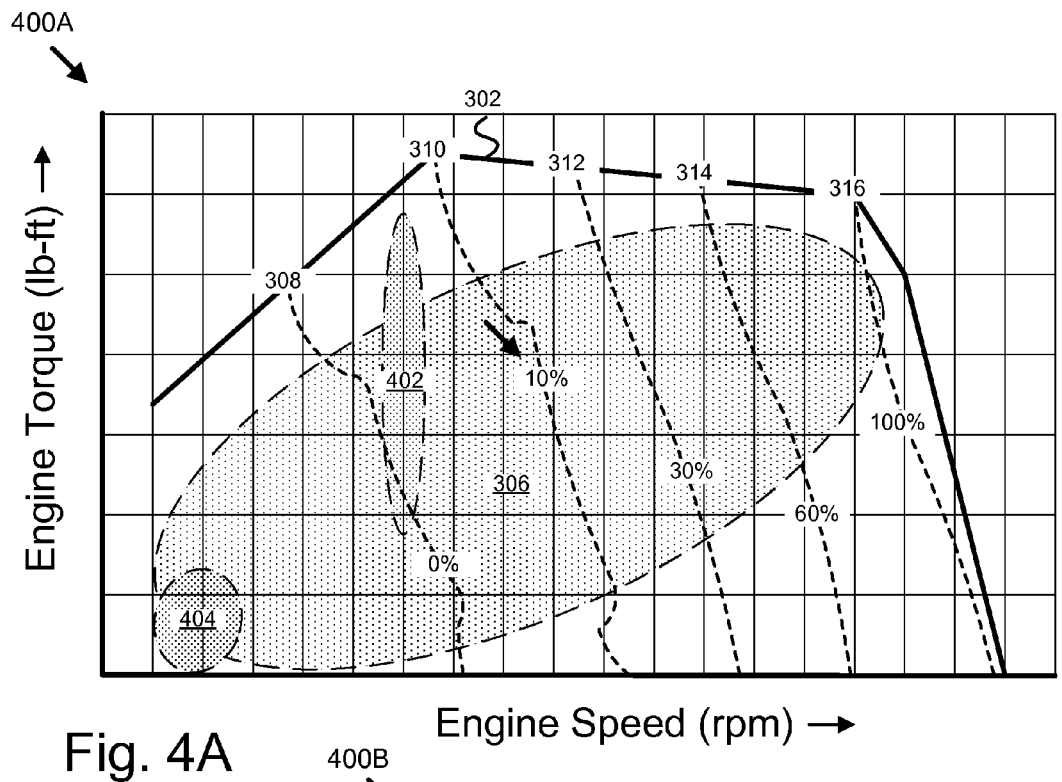
FIG. 4A is a graph illustrating one embodiment of a torque-speed map for an expected engine duty cycle with a typical valve orifice profile.

FIG. 4A is a graph illustrating one embodiment of a torque-speed map 400A for an expected engine duty cycle with a typical valve orifice 202. The torque-speed map 400A may be for an over-the-road tractor trailer where the high-usage area of the torque-speed map 400 occurs in region 402 where the tractor maintains a constant speed for much of the operation cycle, and region 404 where the tractor may idle. FIG. 4A shows the valve open percentage for a typical valve orifice 202, where much of the torque-speed map 400 lies under the 10% valve open curve 310.

Figure 4B:
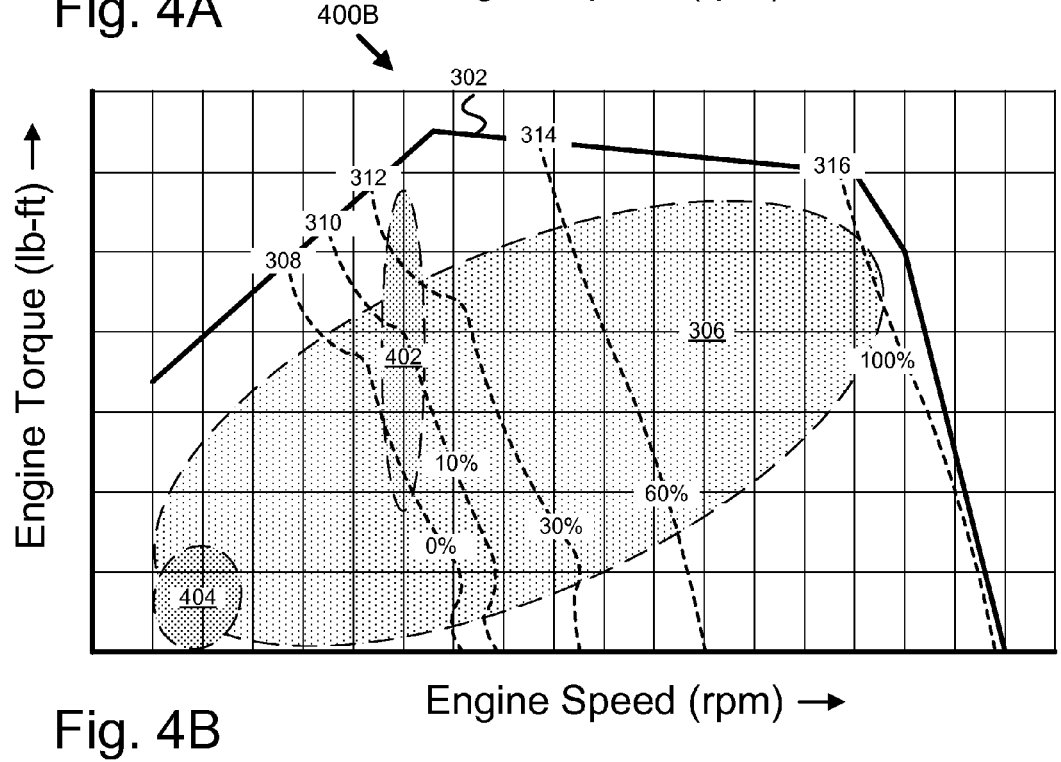
FIG. 4B is a graph illustrating one embodiment of a torque-speed map for an expected engine duty cycle with a shaped valve orifice profile.

FIG. 4B is a graph illustrating one embodiment of a torque-speed map 400B for an expected engine duty cycle with a shaped valve orifice profile associated with one of the shaped orifices of FIGS. 2B-2F. In one embodiment, the relationship between the percentage of the valve 108 open and the percentage of the torque-speed workspace utilized comprises a linear relationship.

Figure 5A:
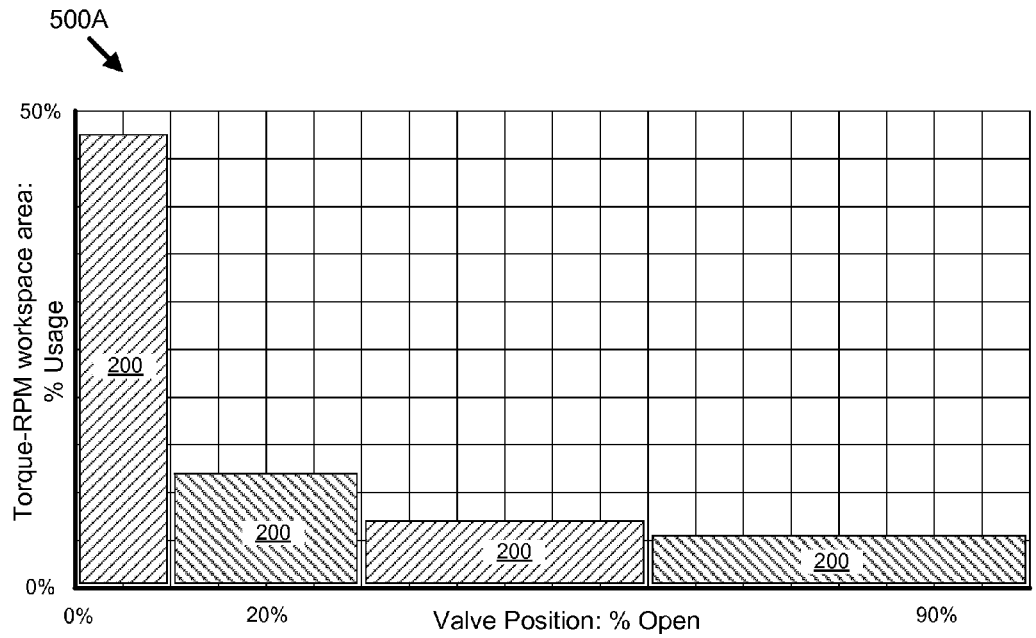
FIG. 5A is a graph illustrating one embodiment of a torque-speed workspace area histogram for a valve position.

FIG. 5A is a graph illustrating one embodiment of a torque-speed workspace area histogram 500A for a valve position of a shaped valve 108 with a shaped valve orifice according to at least one of the embodiments disclosed herein. In one embodiment, the area histogram 500A corresponds to the torque-speed workspace map 400B and provides an additional manner of analyzing the data of the torque-speed workspace map 400B. The histogram 500A may be used to identify points along the torque-speed workspace map 400B to facilitate calibration of the shaped valve orifice.

Figure 5B:
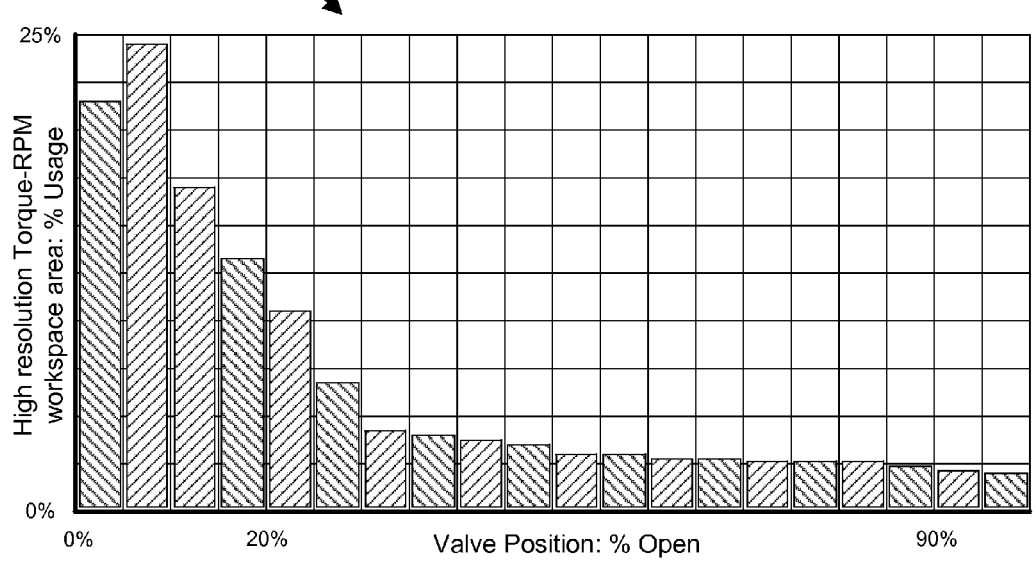
FIG. 5B is a graph illustrating one embodiment of a high resolution torque-speed workspace area histogram for a valve position.

FIG. 5B is a graph illustrating one embodiment of a high resolution torque-speed workspace area histogram 500B. In one example, the high resolution torque-speed workspace area histogram 500B comprises the workspace area histogram of FIG. 5A in greater detail. The higher resolution of FIG. 5B may be utilized to yield a more precisely calibrated valve orifice shape.

Figure 6:
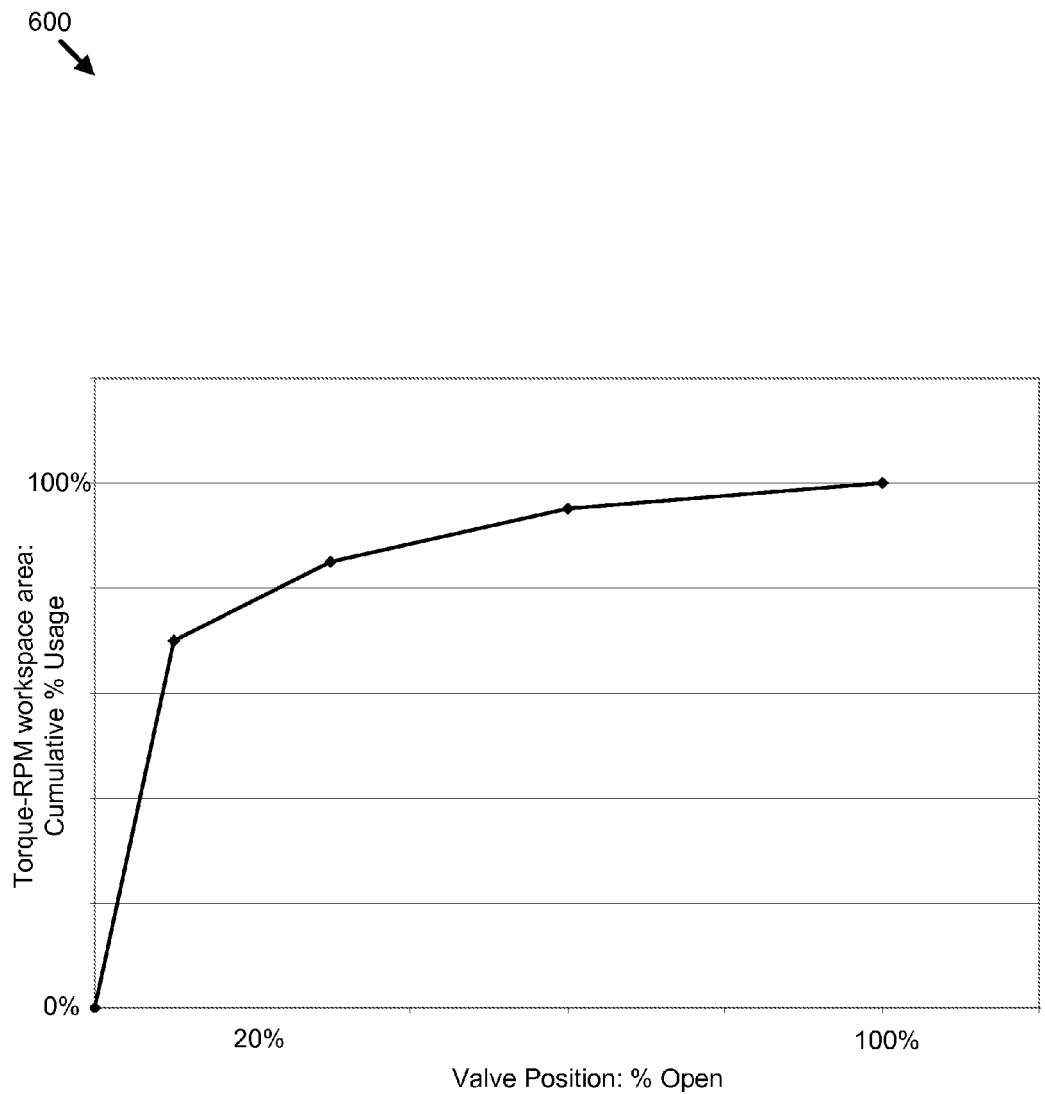
FIG. 6 is a graph illustrating one embodiment of a torque-speed workspace cumulative usage for a valve position.

FIG. 6 is a graph illustrating one embodiment of a torque-speed workspace cumulative usage 600 for a valve position of a shaped valve 108 according to the present disclosure. The graph of cumulative usage 600 may comprise an example of cumulative usage for the torque-speed workspace histograms 500A, 500B. The torque-speed workspace cumulative usage 600 shows the large initial increase in workspace usage within the first 10% of an open valve with decreasing additional workspace usage occurring over the succeeding intervals.

Figure 7:
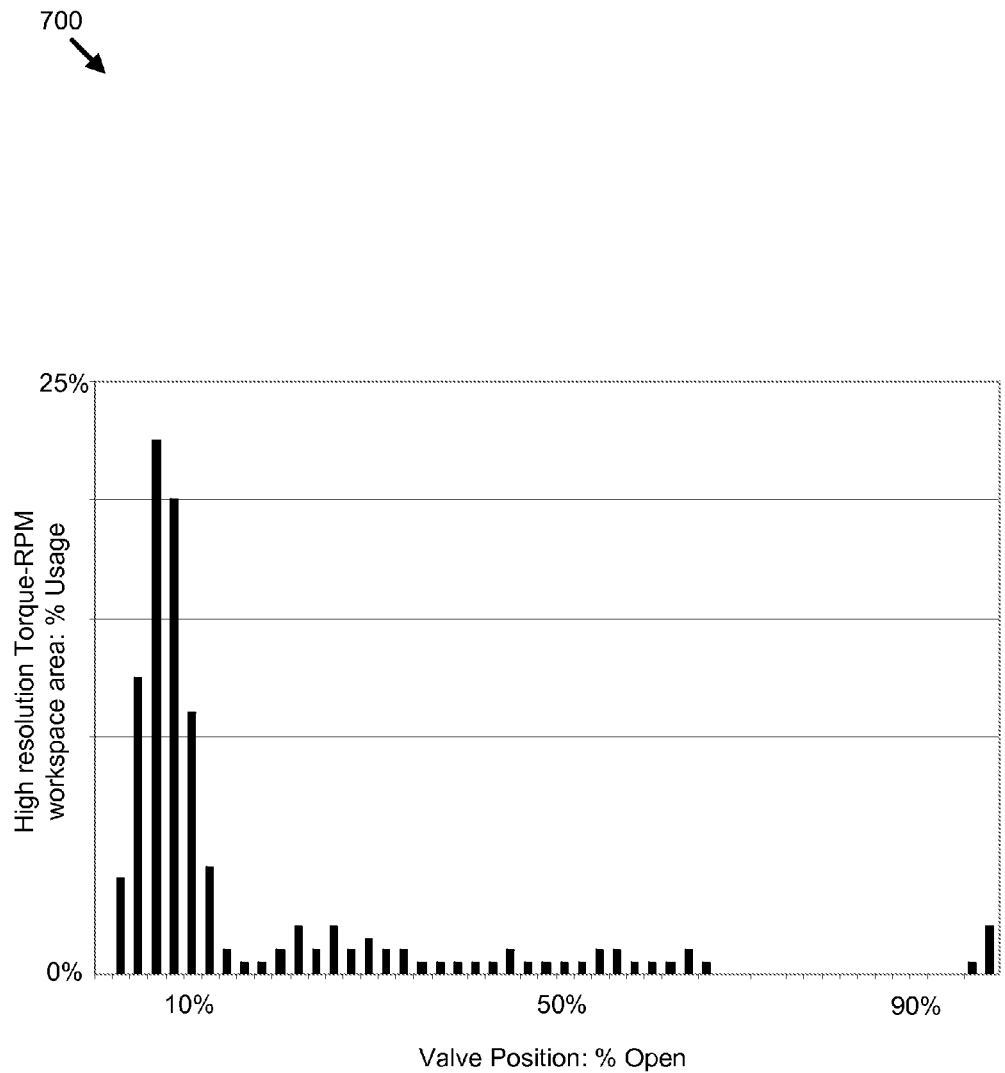
FIG. 7 is a graph illustrating an alternate embodiment of a high resolution torque-speed workspace area histogram for a valve position.

FIG. 7 is a graph illustrating an alternate embodiment of a high resolution torque-speed workspace area histogram 700 for a valve position of a shaped valve 108. The high resolution torque-speed workspace area histogram 700 may comprise an example of a more precise rendering of the torque-speed workspace area histograms 500A, 500B. The more precise rendering may allow for a more accurate shaping of the shaped valve orifice.

Figure 8:
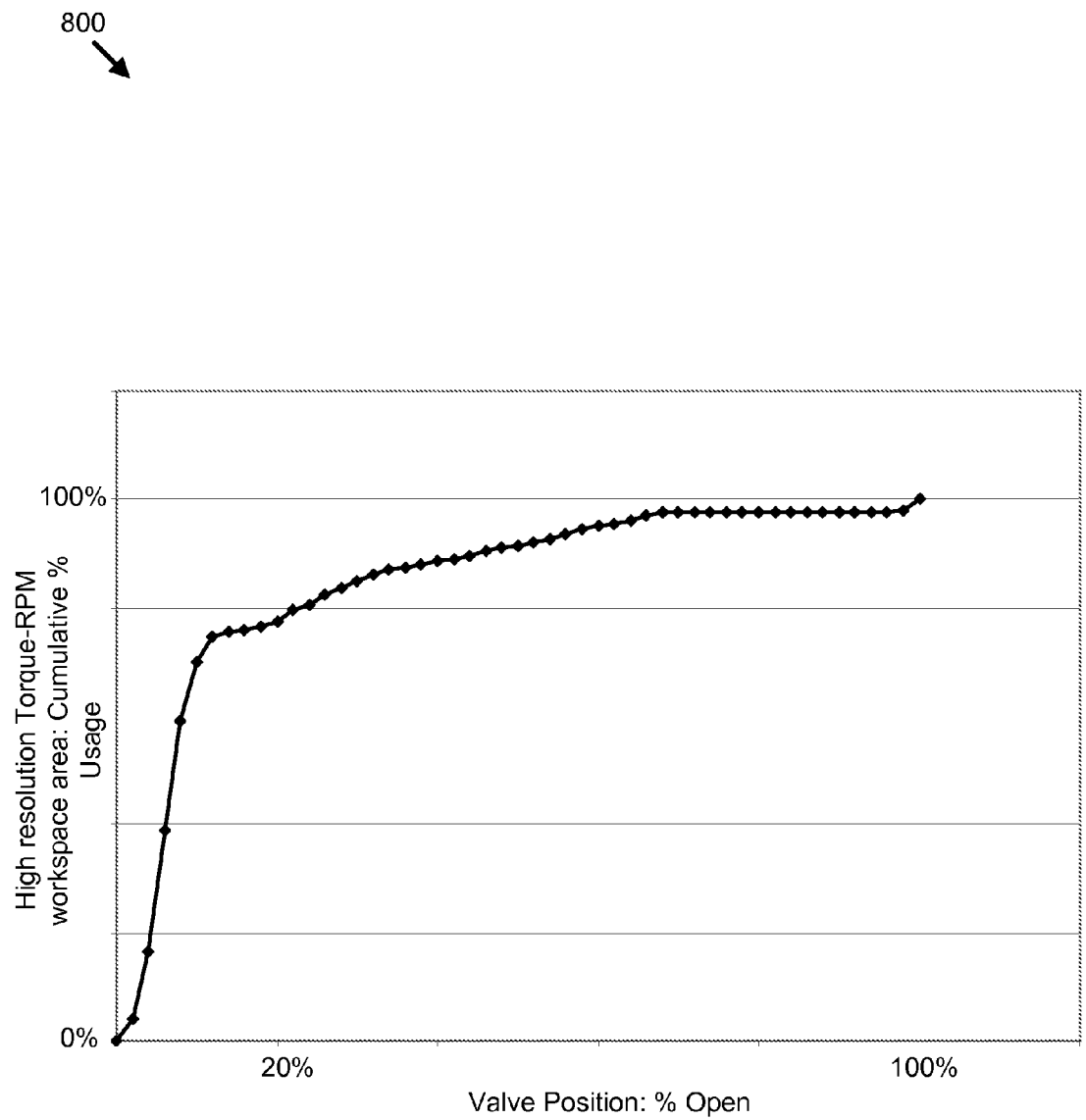
FIG. 8 is a graph illustrating an example of a high resolution torque-speed workspace cumulative usage for a valve position.

FIG. 8 is a graph illustrating an example of a high resolution torque-speed workspace cumulative usage 800 for a valve position of a shaped valve 108. The high resolution torque-speed workspace cumulative usage 800 may comprise an example of the cumulative usage 800 of the high resolution torque-speed workspace area histogram 700.

FIG. 9 is a table illustrating one embodiment of required inputs 900 for optimizing an orifice shape. The required inputs 900 may comprise inputs to a function used to map geometric coordinates from a typical valve orifice to a reshaped valve orifice for a particular application. For example, for each specified point along the cumulative histogram 800, the output characteristic of a current effective flow area (EFA) 904 may be translated by an adjustment factor to a desired EFA 908, and a corresponding current $\theta$ position 902 of a valve 108 may be translated by an adjustment factor to a desired $\theta'$ position 906 of the valve 108.

Figure 10:
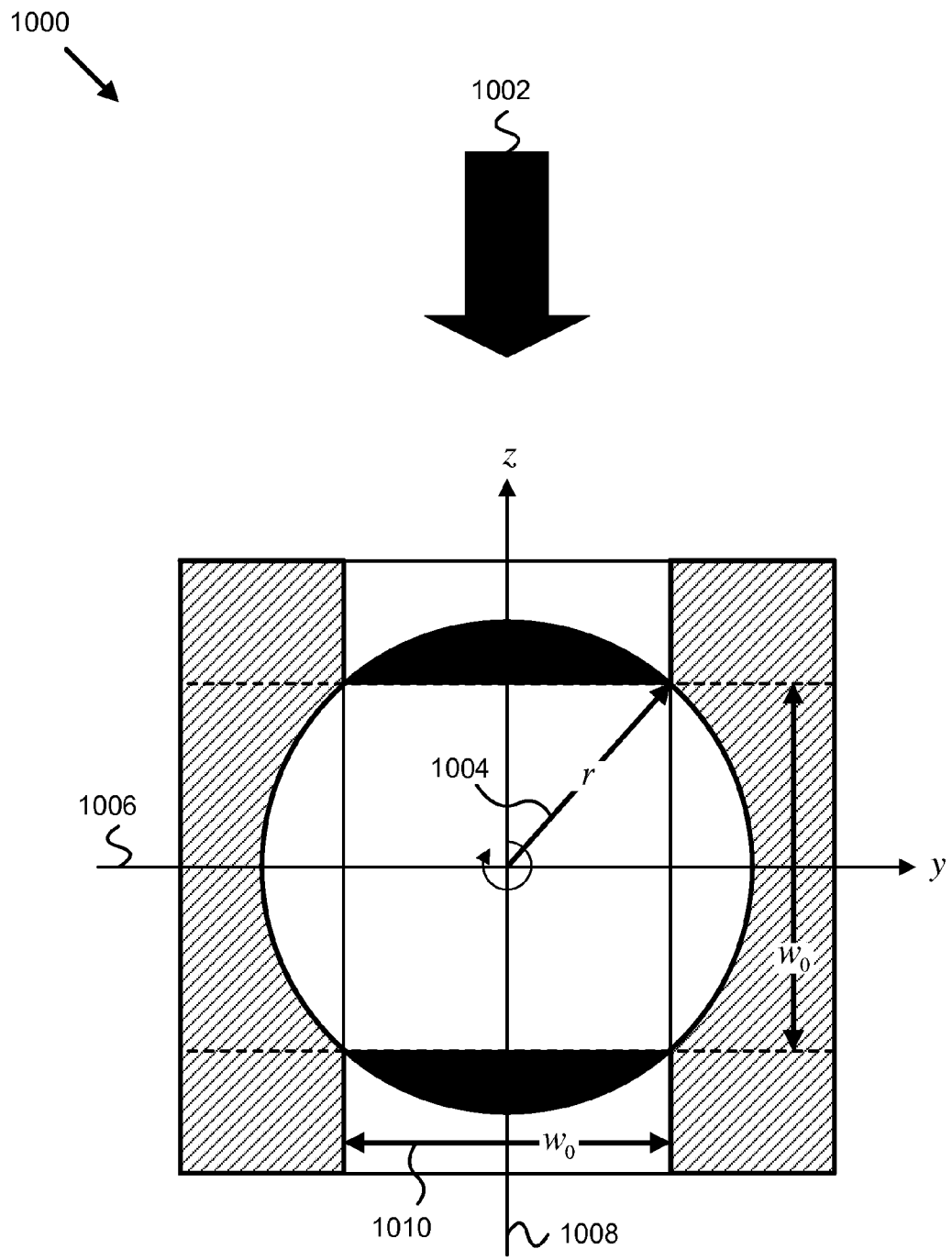
FIG. 10 is an illustration depicting one embodiment of a closed valve geometry.

FIG. 10 is an illustration depicting one embodiment of a closed valve geometry 1000 of a shaped valve 108. The closed valve geometry 1000 illustration shows an exhaust gas 1002 directed toward the valve, a radius 1004, a y-axis 1006, a z-axis 1008, and a width 1010 ($w_0$). An x-axis (not shown) perpendicularly pierces the y-z intersection.

Figure 11:
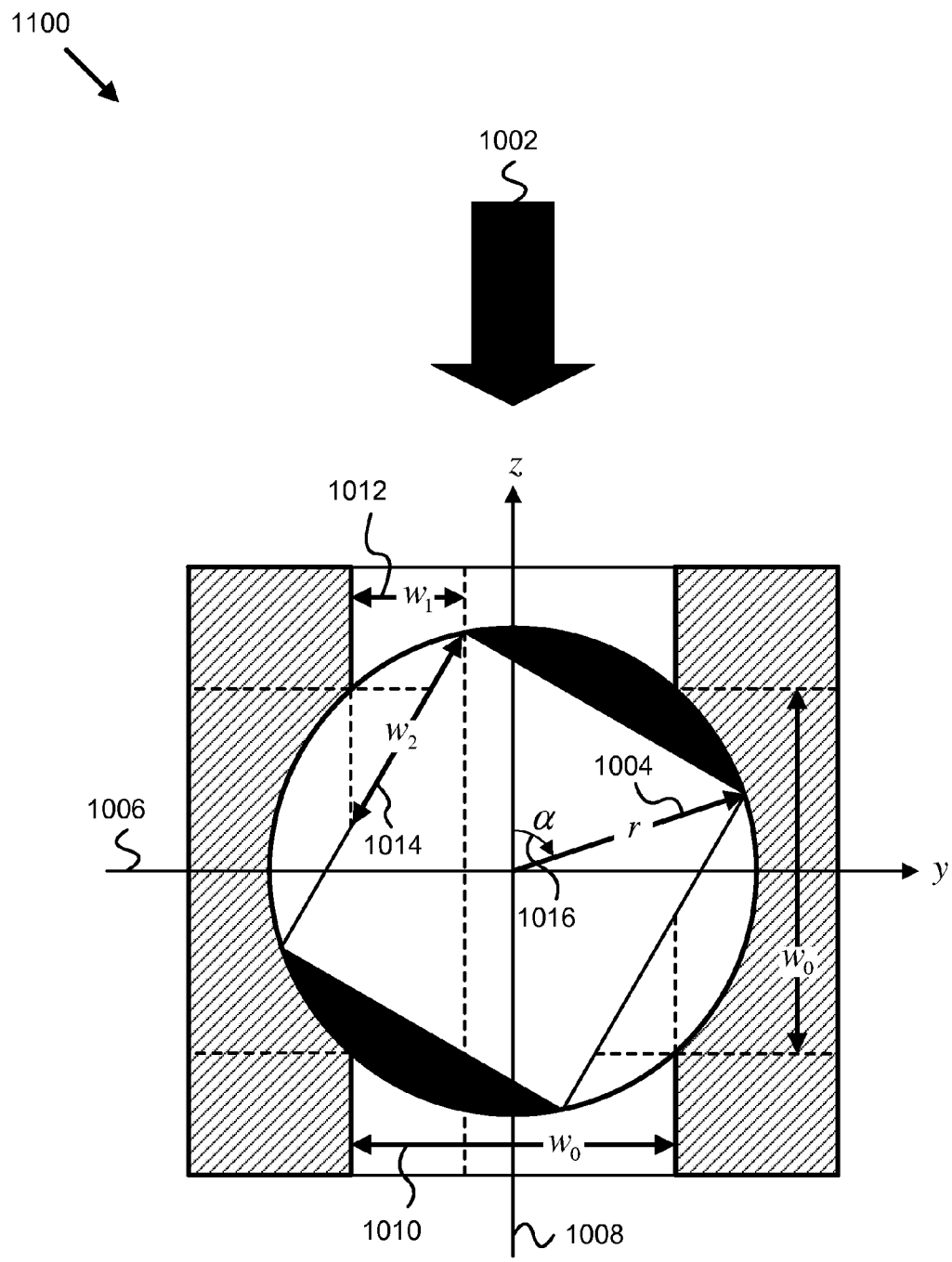
FIG. 11 is an illustration depicting one embodiment of a partially open valve geometry.

FIG. 11 is an illustration depicting one embodiment of a partially open valve geometry 1100. The partially open valve geometry 1100 illustration shows the exhaust gas 1002, the radius 1004, the y-axis 1006, the z-axis 1008, the $w_0$ 1010, a width 1012 ($w_1$), a width 1014 ($w_2$), and an angle 1016 ($\alpha$).

Figure 12:
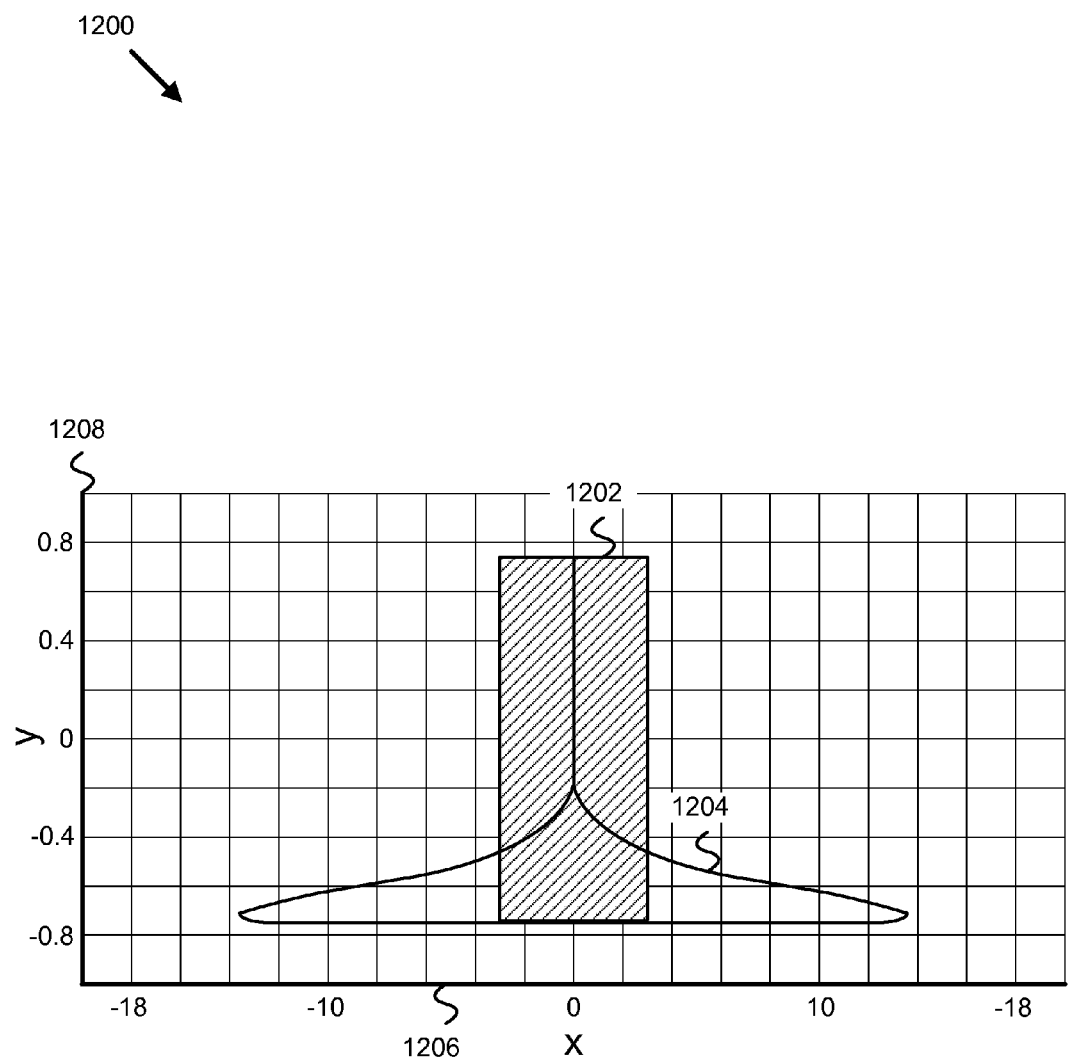
FIG. 12 is a graph illustrating one embodiment of a reshaping of a typical valve orifice.

FIG. 12 is a graph illustrating one embodiment of a reshaping map 1200 of a typical valve orifice 202. The reshaping map 1200 shows an original conventional valve orifice profile 1202, a reshaped valve orifice profile 1204, the x-axis 1206, and the y-axis 1208. In one embodiment, the reshaping map 1200 may be derived by using a projected exposed area (PEA) as an approximation of an effective flow area (EFA) in conjunction with the histograms of FIGS. 7 and 8, and the valve geometries shown in FIGS. 10 and 11.

For example, a current shaped valve 108 comprises a typical valve orifice 202 but modified according to the workspace area percent usage for the plurality of valve positions as shown in FIG. 7. The histogram 700 of FIG. 7 is translated into the cumulative percent usage 800 for the valve position as shown in FIG. 8. Referring to FIGS. 10 and 11, the current or reshaped orifice profile (COF) may be defined as a function of the y-axis such that COF=f(y). An angle $\theta$ may be defined such that $\theta = \alpha - \pi/4$. The width $w_0$ may be written as $w_0 = r\sqrt{2}$, width $w_1$ may be written as $w_1 = r^*\cos(\pi/4) - r^*\cos(\pi z/4 + \theta)$, and width $w_2$ may be written as $w_2 = w_1/\sin\theta$. An exposed area (A) may be written as $A = 2\int f(y)dy$ integrated over the interval $w_0/2$ to $w_0/2 - w_2$. The projected exposed area (PEA) may now be written as $PEA = A \sin\theta$.

In the continuing example, a desired percentage of valve rotation ($\theta'$) may be described as a function of the cumulative workspace histogram 800 such that $\theta' = h_c(\theta)$ where $h_c$ represents the cumulative workspace usage histogram of FIG. 8 and $\theta$ represents a current valve open position. By incorporating the desired theta ($\theta'$) into the PEA definition a desired area may be circumscribed: $PEA = A \sin\theta = A' \sin\theta'$, therefore $A' = A(\sin\theta/\sin\theta')$. Other features of the desired valve profile may be derived where $w'_0 = w_0 = r\cos(\pi/4) - r\cos(\pi/4 + \theta')$, and $w'_2 = w'_1/\sin\theta'$. Increment of change for the shaping of the desired valve profile for each slice of the histogram may be achieved using the following formulas where k comprises an incremental counter for each slice of the histogram: $\theta_{k+1} = \theta_k + \Delta\theta$, $A'_{k+1} = A'_k + \Delta A'$, $\Delta y' = w'_{2_{k+1}} - w'_{2_k}$, and $X'_{k+1} * \Delta y' = \Delta A'$.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 13:
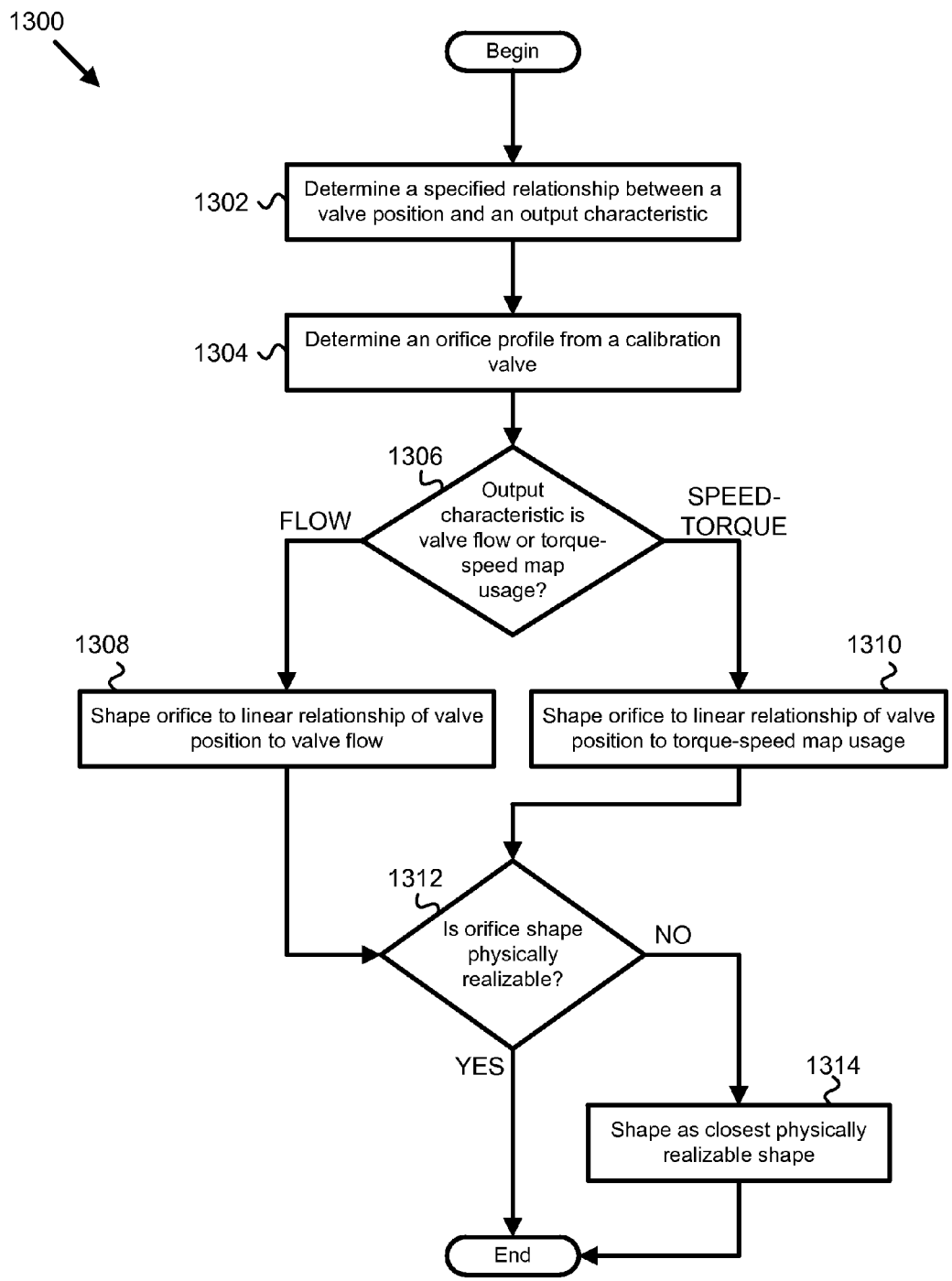
FIG. 13 is a schematic block diagram depicting one embodiment of a method for shaping a valve orifice.

FIG. 13 is a schematic block diagram depicting one embodiment of a method 1300 for shaping a valve orifice. The method 1300 includes determining 1302 a specified relationship between a valve position and an output characteristic, such as valve flow and torque-speed. The method 1300 further includes determining 1304 an orifice profile from a calibration valve. At 1306, a determination is made whether the output characteristic is valve flow or torque-speed map usage. If the output characteristic is valve flow, then the method 1300 continues by shaping 1308 the orifice according to the linear relationship between valve position and valve flow. If the output characteristic is torque-speed, then the method 1300 continues by shaping 1308 the orifice according to linear relationship between valve position and a torque-speed map usage. After the orifice shape is determined, the method 1300 includes determining 1312 if the orifice shape is physically realizable. If it is determined that the orifice shape is physically realizable, then the method 1300 ends. If, however, it is determined that the orifice shape is not physically realizable, then the method 1300 continues by shaping 1314 the orifice to the closest physically realizable shape.

Figure 14:
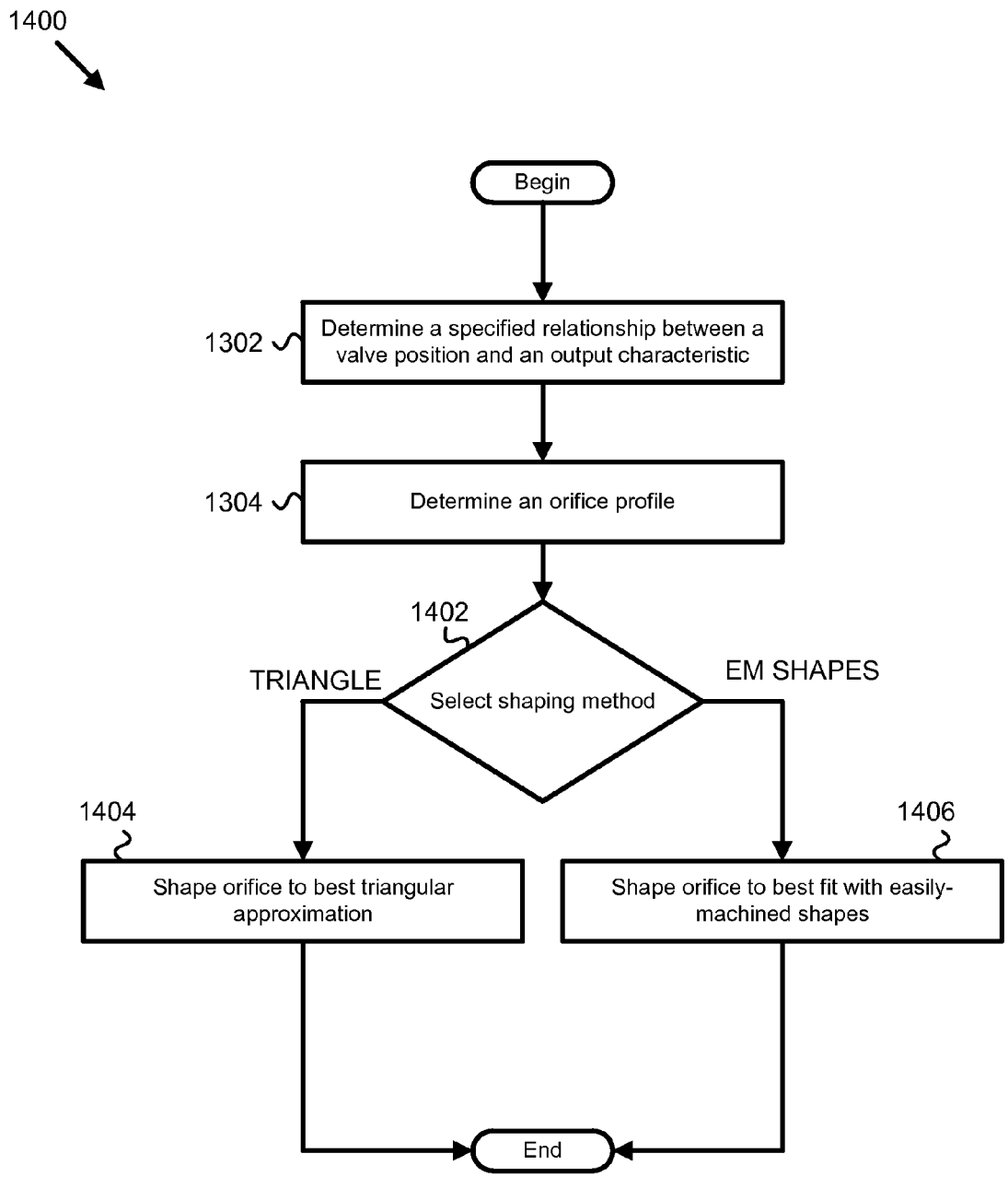
FIG. 14 is a schematic block diagram depicting another embodiment of a method for shaping a valve orifice.

Referring to FIG. 14, a method 1400 for shaping a valve orifice includes determining 1302 a specified relationship between a valve position and an output characteristic. The method 1400 also includes determining 1304 an orifice profile based at least partially on the specified relationship. A desired shaping method is then selected at 1402. In some embodiments, the selected desired shaping method is either a triangle shaping method or a method based on easily-machined (EM) shapes. If the triangle shaping method is selected at 1402, then the method 1400 continues to shape an orifice to a best triangular approximation of the orifice profile. If, however, the EM shaping method 1400 is selected at 1402, then the method 1400 continues to shape the orifice to the closest EM shape. Following shaping of the orifice, the method 1400 ends.

Figure 15:
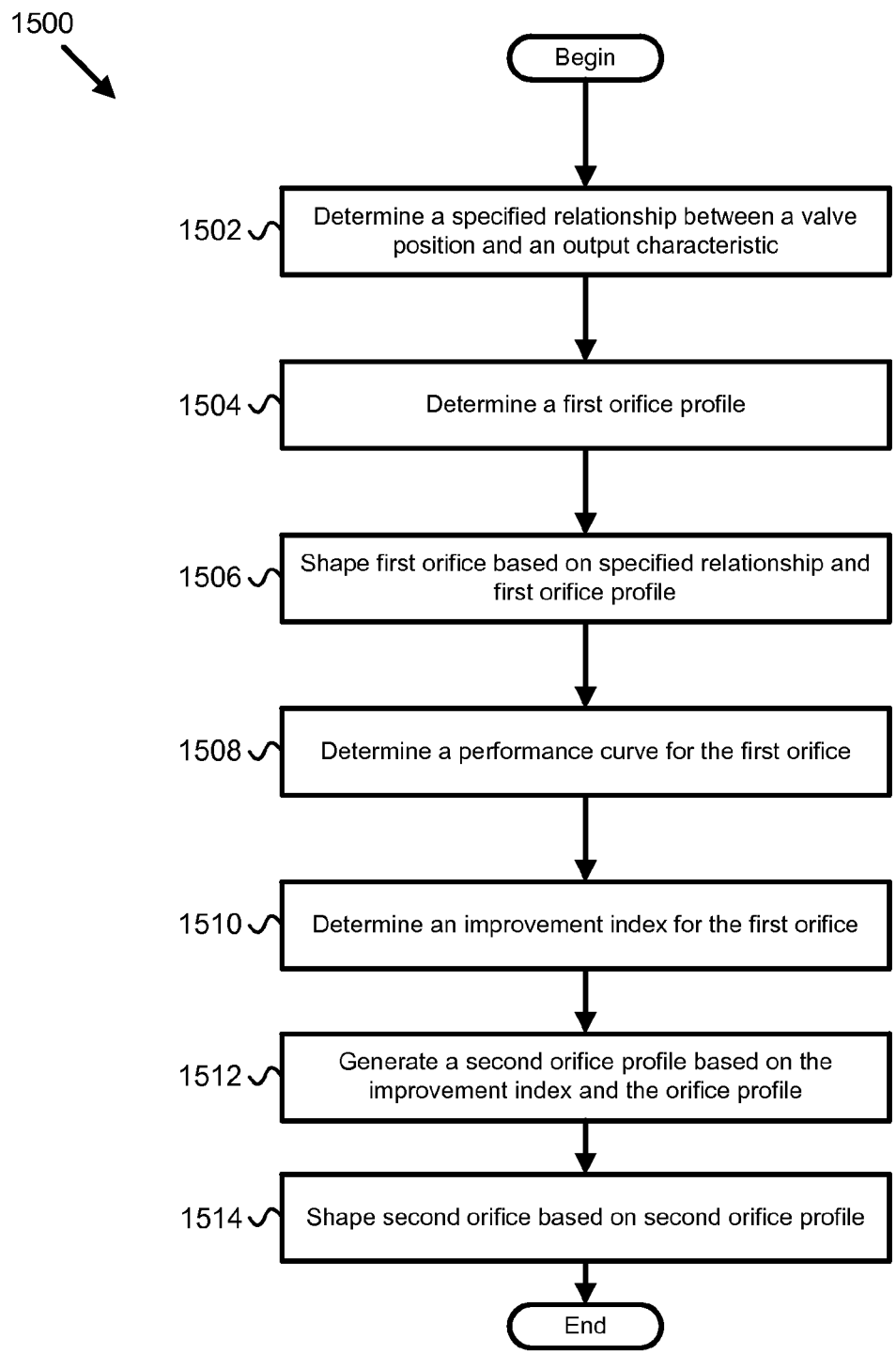
FIG. 15 is a schematic block diagram depicting yet another embodiment of a method for shaping a valve orifice.

Referring now to FIG. 15, a method 1500 for shaping a valve orifice includes determining 1502 a specified relationship between a valve position and an output characteristic. The method 1500 also includes determining 1504 a first orifice profile based at least partially on the specified relationship. The method 1500 proceeds with shaping 1506 a first orifice based at least partially on the specified relationship and first orifice profile. Additionally, the method 1500 includes determining 1508 a performance curve for the first orifice and determining 1510 an improvement index for the first orifice. The method 1500 further includes generating a second orifice profile based on the improvement index and the first orifice profile and shaping 1514 a second orifice based at least partially on the second orifice profile.

The various actions of the methods described herein can be performed by any of various modules or sub-modules forming part of one or more apparatus, systems, or devices, or being in a stand-alone configuration. For example, the disclosure contemplates the use of an apparatus that has a specified relationship module, an orifice profile module, and an orifice shaping module each configured to perform specific actions for optimizing an orifice shape.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for optimizing the cross-sectional shape of an enclosed flow-through passage formed in a rotary valve, the enclosed flow-through passage extending from an intake orifice on one side of the rotary valve to an outlet orifice on an opposite side of the rotary valve, wherein a cross-sectional shape and size of the enclosed flow-through passage are constant along the entire enclosed flow-through passage, the cross-sectional shape being defined by an orifice profile having a leading edge, a trailing edge, and opposing sidewalls extending between the leading and trailing edges, the method comprising:

determining a linear relationship between a change in a position of the rotary valve and a change in an output characteristic;

determining, via a calibration valve coupled to an engine, the orifice profile configured to produce the linear relationship; and shaping the cross-sectional shape of the enclosed flow-through passage in the rotary valve based on the orifice profile such that the rotary valve exhibits approximately the linear relationship, wherein the rotary valve produces a substantially uniform change in the output characteristic for a substantially uniform change in the position of the rotary valve, and wherein the output characteristic is a torque-speed of the engine.

2. The method of claim 1, wherein the output characteristic comprises a relative coverage of at least a portion of a torque-speed map.

3. The method of claim 1, wherein an area of the orifice profile comprises one of a projected exposed area (PEA) and an effective flow area (EFA).

4. The method of claim 3, wherein the area of the orifice profile comprises a PEA, and wherein determining the orifice profile comprises determining the output characteristic for the PEA from the calibration valve.

5. The method of claim 3, wherein the orifice area comprises an EFA, and wherein determining the orifice profile comprises determining the output characteristic for the EFA from a computational fluid dynamics model.

6. The method of claim 1, wherein shaping the orifice in a valve comprises shaping a closest physically realizable orifice in a valve.

7. The method of claim 1, wherein shaping the orifice in a valve comprises a best-fit triangular approximation.

8. The method of claim 1, wherein shaping the orifice in a valve comprises a best-fit approximation of easily-machined shapes.

9. The method of claim 1, wherein the shaped orifice comprises a first orifice, the method further comprising:

determining a performance curve for the first orifice, the performance curve for the first orifice comprising an exhibited relationship between the valve position and the output characteristic for the first orifice;

determining an improvement index for the first orifice based on the performance curve and the specified relationship; and generating a second orifice profile based on the improvement index and the orifice profile such that the second orifice profile exhibits an improved performance curve for the second orifice.

10. An apparatus comprising:

a rotary valve coupled to an engine; and an enclosed flow-through passage formed in the rotary valve, the enclosed flow-through passage extending from an intake orifice on one side of the rotary valve to an outlet orifice on an opposite side of the rotary valve, wherein a cross-sectional shape and size of the enclosed flow-through passage are constant along the entire enclosed flow-through passage, wherein the cross-sectional shape of the enclosed valve orifice comprising a flow-through passage is defined by an orifice profile, the orifice profile configured to produce a linear relationship between a change in a position of the rotary valve and a change in a torque-speed of the engine such that the rotary valve produces a substantially uniform change in the torque-speed of the engine for a substantially uniform change in the position of the rotary.

11. The apparatus of claim 10, wherein the rotary valve comprises a barrel valve.

12. The apparatus of claim 10, wherein the orifice profile is shaped such that for every degree radius of turn of the valve a substantially uniform change in a fluid flow through the valve is achieved.

13. The apparatus of claim 10, wherein the orifice profile is shaped such that for every degree radius of turn of the valve a substantially uniform change in a torque-speed map is achieved.

14. The apparatus of claim 10, wherein the valve orifice comprises an orifice shape configured as a best-fit approximation of easily manufactured shapes.

15. The apparatus of claim 10, wherein the valve orifice comprises a best-fit triangle.

\* \* \* \* \*